(12) United States Patent
Hagqvist

(10) Patent No.: US 6,251,271 B1
(45) Date of Patent: Jun. 26, 2001

(54) DEVICE FOR PURIFYING A FLUID

(75) Inventor: Peter Hagqvist, Stockholm (SE)

(73) Assignee: Aktiebolaget Electrolux, Stockholm (SE)

( * ) Notice: Subject to any disclaimer, the term of this patent is extended or adjusted under 35 U.S.C. 154(b) by 0 days.

(21) Appl. No.: 09/445,867

(22) PCT Filed: Jun. 12, 1998

(86) PCT No.: PCT/SE98/01130

§ 371 Date: Jan. 12, 2000

§ 102(e) Date: Jan. 12, 2000

(87) PCT Pub. No.: WO98/57732

PCT Pub. Date: Dec. 23, 1998

(30) Foreign Application Priority Data

Jun. 19, 1997  (SE) .................................................... 9702354

(51) Int. Cl.[7] .............................. B01D 29/52; B01D 63/00
(52) U.S. Cl. ..................................... 210/195.2; 210/321.6; 210/321.75; 210/321.84; 210/416.1; 210/416.3
(58) Field of Search ............................... 210/195.2, 196, 210/321.6, 321.79–321.81, 321.88–321.9, 416.1, 416.3, 805, 321.75, 321.84

(56) References Cited

U.S. PATENT DOCUMENTS

| 4,702,842 | 10/1987 | Lapierre . |
| 5,066,397 | * 11/1991 | Muto et al. . |
| 5,096,583 | * 3/1992 | Roux et al. . |

FOREIGN PATENT DOCUMENTS 0 002 422    6/1979   (EP) .

OTHER PUBLICATIONS

Patent Abstracts of Japan, vol. 97, No. 7, Jul. 31, 1997 (Jul. 31, 1997), abstract of JP 90–85243 A (TOTO LTD), Mar. 31, 1997 (Mar. 31, 1997).

* cited by examiner

Primary Examiner—W. L. Walker
Assistant Examiner—David Sorkin
(74) Attorney, Agent, or Firm—Pearne & Gordon LLP

(57) ABSTRACT

An apparatus for purifying, by membrane separation, a fluid in a membrane module 1 of pressurized aid purifiers. The fluid is brought to flow through a filtering unit 11 of the membrane module 1. The flow is circulated for efficiency. This recirculation of the fluid takes place within the filtering unit 11. The direction of flow of the fluid through a first flow segment 12 of the filtering unit 11 is opposite the direction of flow of the fluid through a second flow segment 13 of the filtering unit 11.

5 Claims, 1 Drawing Sheet

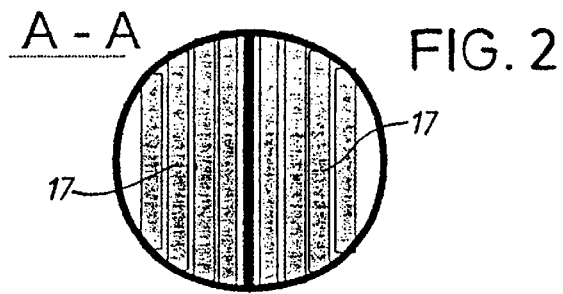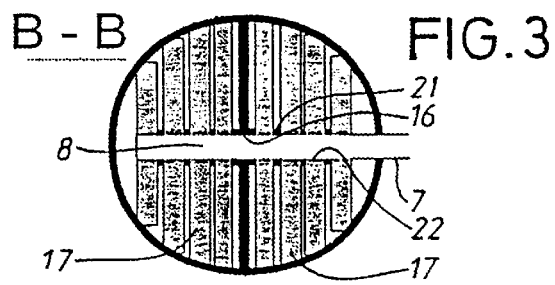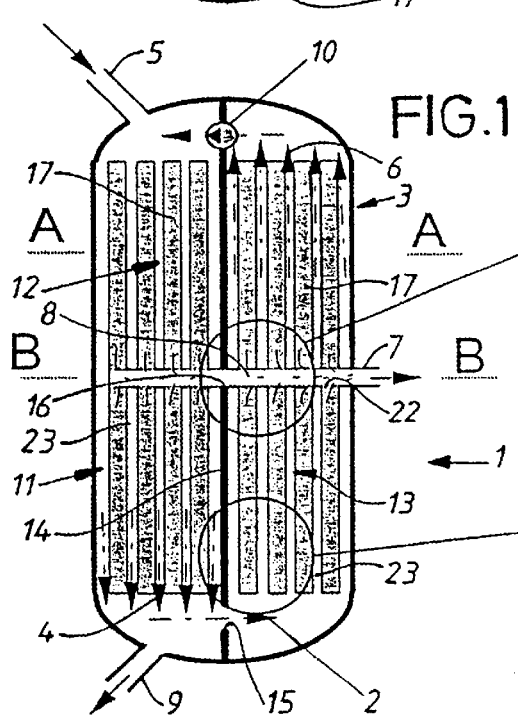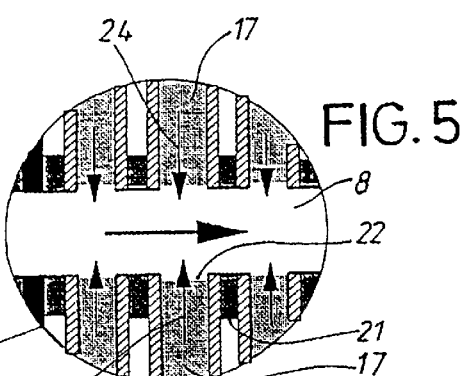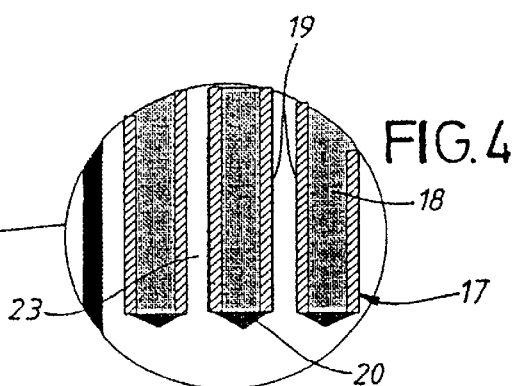

DEVICE FOR PURIFYING A FLUID

TECHNICAL FIELD OF THE INVENTION

The present invention relates to a method for purifying, by means of membrane separation, a fluid in a membrane module of pressurised fluid purifiers, said fluid being brought to flow through a filtering unit of the membrane module in a circulating flow, and that the direction of flow of the fluid through a first flow segment of the filtering unit is opposite the direction of flow of the fluid through a second flow segment of the filtering unit. The invention also relates to a membrane module for pressurised fluid purifiers, said membrane module comprising a pressure vessel that has an inlet for fluid to be purified, a permeate outlet for purified fluid, a reject outlet, and that the membrane module further includes a filtering unit provided in the pressure vessel and a circulating pump.

PRIOR ART

In known water purifiers, where membrane separation is used as a purifying method, the water is circulated/looped through the membrane module in order to achieve a high water efficiency. The water loop is usually effected by having the water to pass through the membrane module and returned at the external side of the module to the low pressure side. This re-circulation may either take place directly in a gap between the module and its pressure vessel or in an external tube conduit.

OBJECTS AND FEATURES OF THE INVENTION

An object of the present invention is to define a membrane module having a water flow that at the most is half the water flow of known membrane modules having the corresponding capacity. Further, the membrane module according to the present invention will have essentially smaller dimensions than the corresponding known module modules. This in itself gives rise to the fact that the circulating pump may have a smaller design and will be more efficient. The membrane module according to the invention may also be designed as a replacement unit that is replaced by a new one when it is worn out.

The objects defined above are realised by means of a membrane module that has been given the features of the appending claims. Preferred alternatives of the invention are defined in the dependent claims.

BRIEF DESCRIPTION OF THE DRAWINGS

In the drawings:

FIG. 1 is a schematic longitudinal section through a membrane module according to the present invention;

FIG. 2 is a section according to A—A in FIG. 1;

FIG. 3 is a section according to B—B in FIG. 1;

FIG. 4 is a detail of the lower end of the filtering unit; and

FIG. 5 is a detail of the connection between the filtering unit and the permeate passage.

DETAILED DESCRIPTION OF AN EMBODIMENT OF THE INVENTION

The membrane module 1, shown in FIGS. 1–5, according to the present invention comprises a pressure vessel 3 that has an inlet 5 for fluid to be purified, a permeate outlet 7 for purified fluid and an outlet 9 for reject.

The membrane module 1 also comprises a circulating pump 10 provided inside the pressure vessel 3 and a filtering unit 11 likewise provided inside the pressure vessel 3.

The design of the filtering unit 11 is what is new and characterizing for the present invention. As is most evident from FIG. 1, in the disclosed embodiment the filtering unit 11 comprises two flow segments 12, 13 that are separated by means of an intermediate stationary partition 14 that supports the circulating pump 10. In the disclosed embodiment the partition 14 reaches all the way to the ends of the pressure vessel 3. By this arrangement there is a possibility to fasten the partition 14 in the ends and in such a way transfer tensile forces between said ends. In such a case the partition 14 may be regarded as a tie-rod that often is used to reinforce pressure vessels. Said partition 14 may for instance constitute a thicker plastic film or a stiff panel. Further, the partition 14 has a first opening 15 at the bottom of the pressure vessel 3 according to FIG. 1 and a second opening 16 at the level where the permeate passage 8 is located, i.e. at about half the height of the pressure vessel 3 in the disclosed embodiment. Further, in this connection it should be pointed out that the partition 14 has an opening also where the circulating pump 10 is supported. The partition 14 is preferably manufactured from a material that is essentially impervious to fluids, however a small leakage through the partition 14 may be tolerated without causing a negative effect upon the function of the membrane module 1.

As notified above the filtering unit 11 according to the present invention comprises two flow segments 12, 13, said each flow segment 12, 13 being composed of a number of filtering elements 17. As is evident from FIGS. 1–3 a number of filtering elements 17 are positioned side by side having an extension that is essentially parallel to each other. In the direction of the height of the pressure vessel, see FIG. 1, the filtering elements 17 have essentially the same extension while in the transverse direction, see FIGS. 2 and 3, the filtering elements have different extension depending on the cylindrical shape of the pressure vessel 3. However, in this connection it should be mentioned that it is not necessary that the filtering elements 17 have a shape that adapts to the pressure vessel 3. It is feasible, within the scope of the invention, that filler elements are provided between the filtering elements 17 and the pressure vessel 3.

Preferably the filtering elements 17, see FIGS. 4 and 5, have such a basic structural design that they consist of a centrally located spacing material 18, in which the permeate may flow, and osmotic layers 19 at both sides of the spacing material 18, said osmotic layers 19 consisting of three sub-layers, i.e. a thin polyester fabric as a carrier, a gel coagulated polysulfon plastic being attached to said carrier, said plastic having small openings, and an outermost located osmotic film of nylon material, said film preferably being attached by adhesion forces. As is shown in FIG. 4 the filtering elements 17 at their bottom have a sealing 20 that for instance may have the shape of a weld or a glue line. As is shown in FIGS. 3 and 5 barriers 21 are provided between the filtering elements 17, at the area of half the height of the pressure vessel 3, the purpose of said barriers being to create a permeate passage 8. Said barriers 21 may for instance constitute a weld or a glue line. Since the barriers 21 are visible in both FIGS. 3 and 5 it is realised that each barrier 21 is closed, all of said barriers 21, together with openings 22 in the filtering elements 17, define said permeate passage 8 that emerges in the permeate outlet 7.

In this connection it should be pointed out that the above in principle described design of the filtering elements constitutes only a preferred embodiment. Thus, within the scope of the invention alternative embodiments of the filtering elements 17 are feasible.

The membrane module 1 described above functions in the following way. Fluid is supplied through the inlet 5, said fluid usually being water that is to be purified. Via the circulating pump 10 the water is brought to flow downwards in FIG. 1 through the left flow segment 12, see the arrows 4 in FIG. 1, through the opening 15, see the arrow 2 in FIG. 1, and then upwards in FIG. 1 in the right flow segment 13, see the arrows 6 in FIG. 1, thereby the circulation path/loop through the membrane module 1 is closed, i.e. the circulating pump 10 circulates the water in the membrane module 1. The main part of the water that is circulated within the membrane module 1 flows in the spaces 23 between the filtering elements 17. However, through reversed osmosis a portion of the water that is circulated in the membrane module 1 will pass through the osmotic layers 19 of the filtering elements 17, said water being called permeate. Said permeate water finds its way to the portion of the membrane module 1 where the lowest pressure exists and consequently said water will be discharged via the permeate passage 8 and the permeate outlet 7. In FIG. 5 the permeate is symbolised by arrows 24. When water passes through the osmotic layers 19 the degree of pollution increases as regards the water circulating in the membrane module 1. In order to avoid that this water is too polluted so called reject water is discharged through the outlet 9, this also implying that a larger quantity of water to be purified may be supplied to the inlet 5. In exemplifying and non-restricting purpose it may be stated that for a normal membrane module according to the present invention 5 litres/min of water to be purified is supplied to the inlet 5. Through the reject outlet 9 one (1) litre/min is discharged and through the permeate outlet 7 four (4) litres/min of permeate is discharged, i.e. purified water. The volume of water that is circulating within the membrane module 1 is 25–50 litres/min. From these exemplifying figures it is evident that from the supplied volume of 5 litres/min, 4 litres/min of purified water is obtained, i.e. 80% of the supplied water is obtained as permeate/purified water.

Since according to the disclosed embodiment of the invention the membrane module also comprises the pressure vessel there exists the possibility to make the pressure vessel so cheap that the entire unit may be exchanged when the membrane module is run down or when a possible error arises.

Feasible Modifications of the Invention

In the embodiment described above the membrane module comprises two flow segments 12, 13. However, it is feasible within the scope of invention to have more than two flow segments that are connected "in series". However, in such a case there might be a need for further circulating pumps. Generally, it is possible that the different flow segments are so adapted to each other that the first segment has a larger active surface than the second segment that in its turn has a larger active surface than segment number three and so on. This may be achieved by having a different number of filtering elements 17 in the different flow segments. By this arrangement the velocity of the circulating/looping flow is adapted to the condition that purified water/permeate permanently is discharged through the osmotic layer 19 of the filtering elements 17 and thus the amount of water is decreased in the circulating/looping flow in the downstream direction of the flow.

What is claimed is:

1. Membrane module (1) of pressurised fluid purifiers that use membrane separation, said membrane module (1) comprising a pressure vessel (3) that has an inlet (5) for fluid to be purified, a permeate outlet (7) for purified fluid, and a reject outlet (9), the membrane module (1) further comprising a filtering unit (11) provided in the pressure vessel (3) and a circulating pump (10), characterized in that the filtering unit (11) comprises at least two flow segments (12, 13), that the separation between the flow segments (12, 13) is essentially impervious to fluids along essentially the entire length of the flow segments (12, 13) in a direction of flow (4, 6) of the fluid to be purified, that a permeate passage (8) for purified fluid is located in the flow segments (12, 13), said permeate passage (8) extending transverse to the extension of the flow segments (12, 13) in said direction of the flow (4, 6) of the fluid to be purified that the filtering unit (11) comprises a plurality of filtering elements (17) extending in said direction of flow, each of said filtering elements having a seal (20) at one end and an opening (22) at the other end, and adjacent openings (22) being connected with each other by barriers (21) that surround the openings (22), and that the permeate passage (8) is defined by and in communication with said openings (22) and said barriers (21).

2. Membrane module (1) according to claim 1, characterized in that at least two flow segments (12, 13) are located at both sides of a partition (14) provided in the pressure vessel (3), said partition (14) having openings (15) for providing a circulating/looping flow within the pressure vessel (3), and that said circulating/looping flow passes through the flow segments (12, 13).

3. Membrane module (1) according to claim 2, characterized in that the partition (14) provided in the pressure vessel (3) is in the shape of a tie-rod.

4. Membrane module (1) according to claim 1, characterized in that the seals (20) constitute a weld or a glue line.

5. Membrane module (1) according to any of the claims 1, 2 and 4, characterized in that the active surface of the flow segments (12, 13) decreases in the direction of the flow, seen from the inlet (5) of the fluid to be purified.

* * * * *